Dec. 4, 1928.                                                    1,694,164
              D. N. CROSTHWAIT, JR
          METHOD AND APPARATUS FOR SETTING THERMOSTATS
          Original Filed Sept. 30, 1925    2 Sheets-Sheet 1
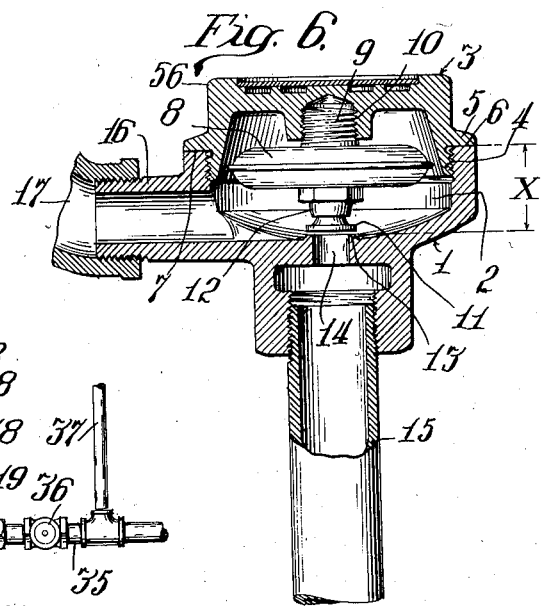
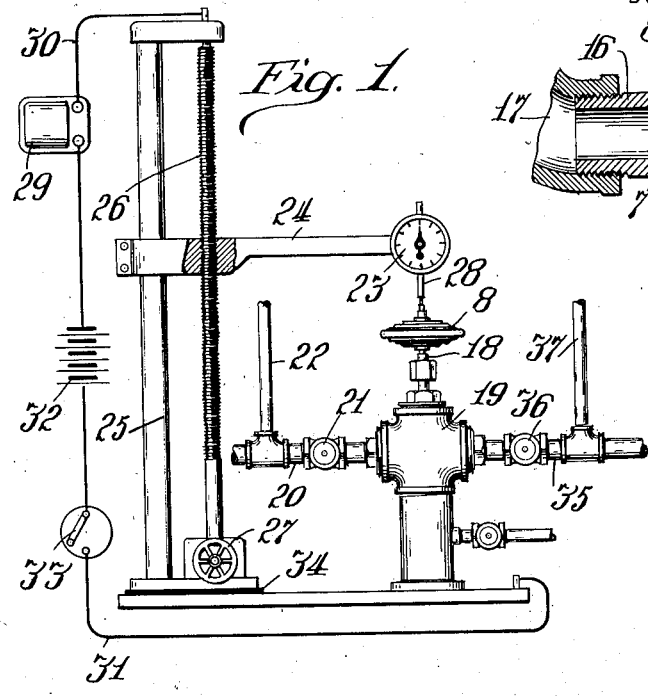
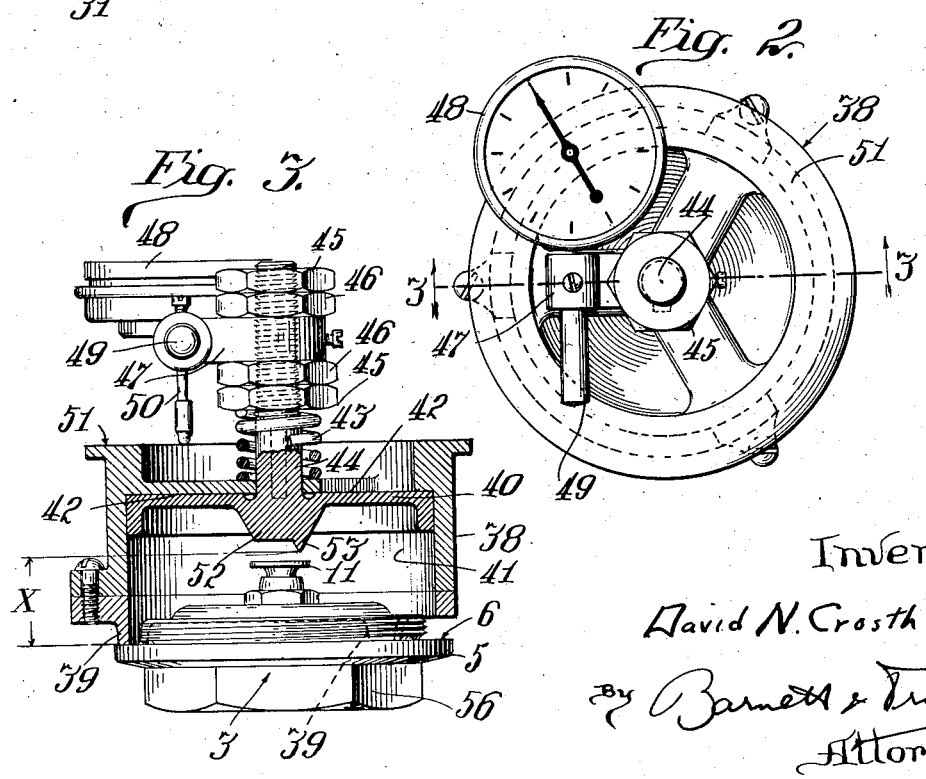
Inventor
David N. Crosthwait Jr.

Dec. 4, 1928.  1,694,164
D. N. CROSTHWAIT, JR
METHOD AND APPARATUS FOR SETTING THERMOSTATS
Original Filed Sept. 30, 1925   2 Sheets-Sheet 2
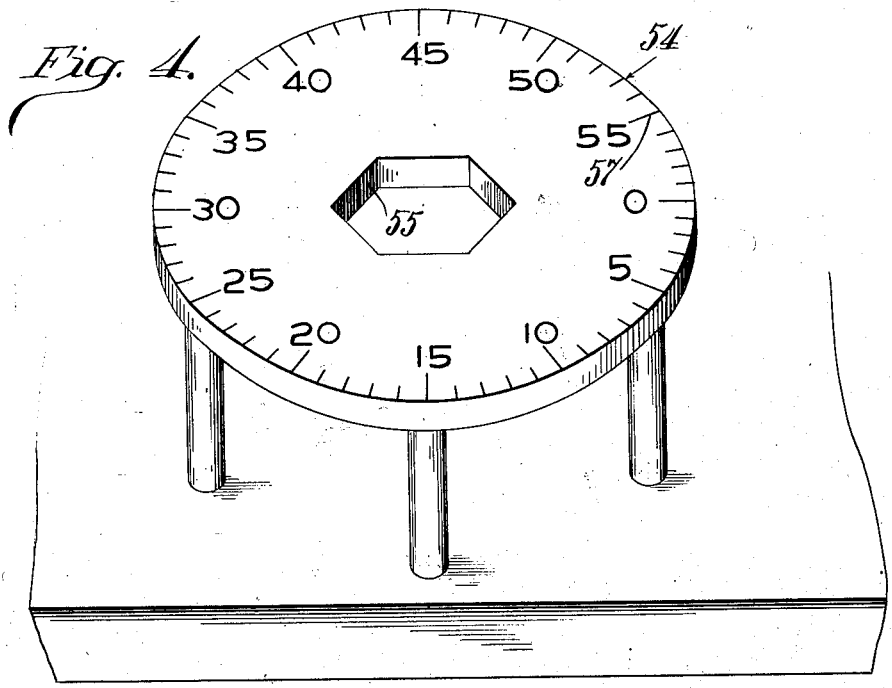
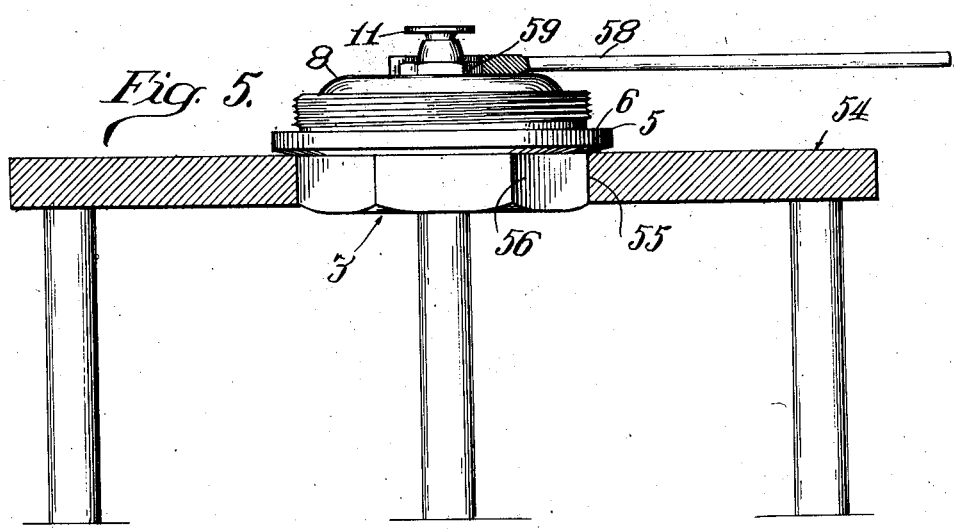
Inventor
David N. Crosthwait, Jr,
By Barnett & Truman
Attorneys Patented Dec. 4, 1928.

1,694,164

UNITED STATES PATENT OFFICE.

DAVID N. CROSTHWAIT, JR., OF MARSHALLTOWN, IOWA, ASSIGNOR TO C. A. DUNHAM COMPANY, OF MARSHALLTOWN, IOWA, A CORPORATION OF IOWA.

METHOD AND APPARATUS FOR SETTING THERMOSTATS.

Original application filed September 30, 1925, Serial No. 59,704. Divided and this application filed September 10, 1927. Serial No. 218,846.

This invention relates to a new and improved method and apparatus for properly adjusting or setting thermostats in their supporting members, and more particularly for setting the thermostats in thermostatic traps, although it is to be understood that this new method and apparatus is adapted for adjusting thermostats of different types and in different installations than the one hereafter illustrated by way of example. The present application is a division of my copending application Serial No. 59,704, filed September 30, 1925, now Patent No. 1,661,323, granted March 6, 1928, in which this subject-matter was first disclosed.

In the type of thermostatic traps here under consideration, a thermostat comprising a hollow diaphragm member containing a volume of expansible fluid is adapted, when heated by surrounding steam, to expand and move a valve against a valve seat and thus cut off the flow of steam through an outlet passage. When the steam condenses, the cooler water will contract the thermostat and open the valve allowing the water of condensation to run out. In assembling the thermostatic disks or diaphragms, the expansion member is filled with an expansible fluid and when cold the vapor pressure in the disk approaches a vacuum. As the thermostat is heated the vapor pressure inside the disk will increase and under operating conditions this internal pressure is a definite amount in excess of the exterior steam pressure.

The expansion diaphragms used in these thermostats, like all expansible and contractible containers made of metal, do not expand uniformly when subjected to the same temperatures, or internal pressures, even though made from the same dies. As a consequence, the operations of different thermostats, when installed in the same or similar traps will vary. In order to secure uniformly operating traps, the thermostat should be set so that for a given steam pressure, and consequent temperature, the thermostat will move the valve disk against its seat at the limit of its expansion. The effects of variations from normal expansion of different thermostats can be eliminated, or compensated for, if the actual expansion of the disk is measured under actual working conditions, or under conditions simulating such working conditions, and the thermostat set in its supporting member so as to compensate for the variation from normal expansion. The new method of setting the thermostats herein disclosed and claimed embodies this principle, and the principal object of this invention is to provide a simple, accurate, and rapidly operating means and method of thus setting the thermostats.

In brief, the total expansion or opening of the thermostatic disk is first measured under simulated operating conditions. After the disk has been filled with the expansible fluid and sealed, it is assembled or set in a trap top to an approximately correct position, and then its "opening", when cold, is measured by a suitable gauge or indicator. The setting of the thermostat is then adjusted to compensate for the difference between this measured opening and the actual measured opening of the heated disk which was determined before it was set in the trap top.

One object of the invention is to provide an improved method for setting thermostats as briefly outlined hereinabove and as described in detail hereinafter.

Another object is to provide an improved means for measuring the total expansion of the thermostats under simulated working conditions.

Another object is to provide an improved means for measuring the "opening" for which a thermostat is set in its supporting member, that is the distance that it will have to move or expand to properly seat the valve carried thereby upon the valve seat in the trap.

Other objects and advantages of this invention will be apparent from the following detailed description of certain approved forms of apparatus for carrying out the principles of this invention.

In the accompanying drawings:

Fig. 1 is a diagrammatic view of a mechanism for measuring the expansion of the thermostat.

Fig. 2 is a plan view of the gauge for measuring the "opening" for which the thermostat has been set in its support.

Fig. 3 is a vertical section, taken substantially on the line 3—3 of Fig. 2.

Fig. 4 is a perspective view of the plate or support which forms a portion of the adjusting mechanism.

Fig. 5 is a central vertical section through this supporting plate, illustrating the method of adjusting the thermostat in the trap top to compensate for variations from normal expansion.

Fig. 6 is a central vertical section through an installation illustrating the construction and operation of one of the thermostatic traps which it is the function of this invention to properly adjust.

In Fig. 6 is illustrated a thermostatic steam trap of the type with which this invention is directly concerned, although it is to be understood that this new method and apparatus is adapted for adjusting and setting thermostats in different installations than here illustrated. The casing 1 of this steam trap forms a housing for a steam space 2, the housing being closed at the top by a cap or top 3 having a flange 4 which screws into the casing. An outwardly extending flange 5 on top 3 has a lower surface 6 adapted to seat closely against the upper surface 7 of casing 1 when the trap is assembled. The thermostatic member or disk 8 is of any approved diaphragm type adapted to expand when heated, preferably enclosing a volume of volatile liquid for causing the desired expansion, as is well understood in the art. In the well-known form here shown, the disk 8 is formed of a pair of opposed dished flexible metallic members joined at their edges, one of the members being initially provided with a small central opening through which the volatile liquid is inserted. This opening is then plugged and sealed. A stud 9 extending from the center of one diaphragm of disk 8 is adapted to screw into the socket 10 projecting downwardly from cap or top 3 and thus hold the thermostat in place within the trap. It will be seen that the top 3 constitutes the supporting member for the thermostat, and it is the object of this invention to properly adjust the thermostat with relation to the supporting top, which may be accomplished by screwing the stud 9 into or out of the socket 10, all as hereinafter described. A valve plate 11 is supported, preferably by a universal connection 12, from the opposite diaphragm member of disk 8. When the thermostat is expanded, valve plate 11 is adapted to seat against the valve seat 13 in casing 1 and close the outlet passage 14. When the thermostat 8 contracts, valve plate 11 will be moved away from valve seat 13 and the passage 14 will be open to allow water of condensation to flow from the trap through outlet pipe 15. It will be understood that the space 2 within the trap is in communication through lateral extension 16 with a pipe 17 leading from a steam supply, or a space normally filled with steam such as a radiator.

The vertical distance from valve 11 to valve seat 13 when the thermostat is cold and contracted is the "opening" frequently referred to in this description. If the thermostat is properly adjusted, when space 2 is full of steam at the pressure for which this trap is adapted, the thermostat 8 will expand to its full extent and seat the plate 11 against valve seat 13. It is the purpose of this invention to provide a new and improved method and means for adjusting each thermostat 8 in its mounting 3 so that the valve plate 11 and valve seat 13 will properly cooperate to close the trap when subjected to normal working temperature and pressure. As stated hereinabove, the thermostats 8, although made from the same dies and as nearly as possible alike, will not expand equally and it is necessary to adjust each assembled thermostat and trap top differently to insure proper seating of the valve.

Referring now to the apparatus shown in Fig. 1, a thermostatic disk 8, before it is filled with the expansible fluid, is mounted as shown with its open side connected by disk adapter 18 with the casing 19 of the testing apparatus. Casing 19 is in communication through pipe 20 controlled by quick opening valve 21 with an exhauster or other source of vacuum, and 22 illustrates the connection to a vacuum gauge, preferably of the mercury column type. The dial indicator 23 is mounted on the horizontal arm 24, supported from and vertically slidable along a vertical column 25. The dial is bodily adjusted up and down by means of the screw 26 which engages a nut in arm 24, the screw being operated through suitable gearing from the hand wheel 27. The disk 8 is first exhausted by opening the valve 21, and then the dial 23 is adjusted downwardly by means of hand wheel 27 until the dial plunger 28 contacts with the disk. The proper adjustment may be indicated by a buzzer 29 which is wired so that its circuit will be closed by the contact of plunger 28 with the thermostat disk 8. As shown, one wire 30 from the buzzer is connected with the supporting means for the dial 23, and the other wire 31 of the circuit is connected with the supporting means for casing 19. The circuit also includes the battery 32 and circuit breaker or switch 33. Suitable insulation 34 must be used between the dial supports and the supports for casing 19 so that the circuit can only be completed through the dial and thermostatic disk. After the mechanism is thus adjusted for the zero expansion of the disk, fluid under pressure, preferably compressed air, is admitted to casing 19 and thermostat 8 through pipe 35 controlled by quick opening valve 36. The air pressure should be equal to the effective pressure of the expansible fluid in the disk under normal operating conditions, this pressure having been previously ascertained by suitable measurements. At 37 is a connection to a mercury gauge for determining the correctness of this air pressure. The dial 23 will now indicate the total expansion or "opening" of the thermostatic disk.

The thermostatic disks as they are tested by this instrument or mechanism will be sorted according to the movement or "opening" they are found to have. Each disk having a given opening, within certain limits, will be placed with all other disks having the same opening. The disks will then be filled with the expansible fluid, exhausted and sealed, but will be kept sorted. The disks are now to be assembled in the trap tops, and if all of a given sorted class are handled at one time, the approximately correct setting can soon be ascertained. This approximate opening for which the disk or thermostat is set is now measured by means of the gauge shown in Figs. 2 and 3. The casing 38 of this gauge has a plurality of spaced projections 39 distributed about the edge of its open side and adapted to seat against the surface 6 on outwardly projecting flange 5 of the trap top. (See Fig. 3.) A plunger 40 slidable vertically in recess 41 of casing 38 is normally held up against the top 42 of the casing by means of a spring 43 which surrounds a stem 44 projecting upwardly from plunger 40, the spring being confined between the top of casing 38 and the lock nut 45 mounted on stem 44. The lock nuts 45 and adjusting nuts 46 also hold in adjusted position on stem 44 the supporting bracket 47 for the dial indicator 48. Dial test indicator 48 is carried by a stem 49, horizontally adjustable through bracket 47, and the plunger 50 of the dial indicator thrusts against the upper surface 51 of casing 38. The parts will be so adjusted that in the position shown in Fig. 3 the indicator will read zero. The plunger 40 is formed centrally with a projection 52 having a knife edge or series of prongs 53 which are adapted to contact with valve plate 11 on the thermostat. The distance from the plane of the ends of projections 53 to the plane of the ends of the projections 39, (indicated by $x$ in Fig. 3), will be equal to the vertical distance from seating surface 7 to the valve seat 13 of the trap body 1 for which this thermostat is designed, which is also illustrated by $x$ in Fig. 6.

When the gauge 38 is assembled over a thermostat and trap top as shown in Fig. 3, it will be apparent that the distance between the seating surface of valve plate 11 and the ends of prongs 53 will be equal to the opening or expansion that the thermostat must have in order to properly seat when placed in the trap body 1. With the assembled thermostat and trap top in place as shown in Fig. 3, the plunger 40 will be depressed against the force of spring 43 until prongs 53 contact with the valve plate 11, and the dial test indicator 48 will then read the opening for which the thermostat is set. Preferably this dial indicates the opening in one-thousandths of an inch. This setting is then compared with the previously measured opening for that particular thermostat as determined by the apparatus shown in Fig. 1. The setting of the thermostat in the valve top must now be corrected the necessary amount so that the actual opening for which it is set will correspond with the measured opening of that particular thermostat as previously determined. For example, if the stock of disks then being assembled should have an opening of .025 of an inch, and when tested by indicator or gauge 38 the dial indicator 48 shows the disk to be set for an opening of .019 of an inch, it will be apparent that the opening for which the disk is set must be increased by six thousandths of an inch in order that the thermostat may operate properly within one of the traps.

In order to conveniently and expeditiously make this adjustment, the mechanism shown in Figs. 4 and 5 is provided. A suitably supported table or plate 54 is formed with a central opening 55 of a configuration and size adapted to receive and grip the head 56 of the trap top 3, here shown as hexagonal in shape. The upper surface of plate 54 is provided with a graduated dial 57, preferably centered about the opening 55. The assembled trap top and disk which has just been tested as previously described, is positioned with the hexagonal top 56 within the opening 55, as shown in Fig. 5. A suitable wrench 58 is now engaged with the nut 59 on the base of thermostat 8 and by moving this wrench in one direction or the other, the stud 9 is screwed in or out of the socket 10 in top 3, whereby the distance between the plane of seat 6, and the seat engaging surface of valve plate 11 may be varied. In the device here shown, the dial 57 is graduated so that each space on this dial represents a vertical adjustment of one one-thousandth of an inch of valve plate 11. The handle of wrench 58 serves as an indicator for showing the amount of angular adjustment of the thermostat. In the example previously noted, the handle 58 would be moved through six divisions of the dial 57 in the proper direction to screw the stud 9 further into the socket 10 so as to increase the opening for which the thermostatic disk is set by six one-thousandths of an inch. The adjusting mechanism just described, and disclosed in Figs. 4 and 5, has been made the subject matter of and it is claimed in a copending application, Serial No. 218,845, filed September 10, 1927.

By suitably varying the design of the testing and setting devices, thermostats and mountings of different form or design than that here shown may be tested and adjusted without departing from the principles of operation hereinabove described.

The calibrations on the dials 23, 48 and 57 need not be in thousandths of an inch as described, nor need not be exactly as shown in the drawings, it only being essential that these graduations be in conformity with one another, so that errors indicated on dial 48 may be translated into corrections on dial 57.

In another form of thermostatic trap, not here illustrated, the disk 8 is permanently and non-adjustably fixed to the trap top 3, but a screw adjustment is provided between the valve plate 13 and the thermostatic disk 8. It will be apparent that this form of trap could be tested and adjusted in exactly the same manner as hereinabove described, the opening being varied by adjusting the distance between the valve plate 13 and the thermostatic disk.

I claim:

1. The method of adjusting the setting of an expansion thermostat in the member by which it is supported when in service, which consists in first determining the maximum expansion which the thermostat will have under operating conditions, then assembling the thermostat with its supporting member and measuring its opening when contracted, and adjusting the setting to make the opening when contracted equal the previously ascertained expansion.

2. The method of adjusting the setting of an expansion thermostat in the member by which it is supported when in service, which consists in first determining the maximum expansion which the thermostat will have under operating conditions, then assembling the thermostat with its supporting member and measuring the opening for which it is temporarily set, determining the difference between this opening and the previously ascertained expansion of the thermostat, and adjusting the setting an amount equal to this difference so that the opening will correspond to the measured expansion.

3. The method of adjusting the setting of an expansion thermostat in the member by which it is supported when in service, which consists in subjecting the thermostat before assembling it with its supporting member to an internal pressure equal to the maximum to which it will be subjected when in service and measuring its expansion under these conditions, inserting the volatile expansive fluid, sealing the thermostat, mounting the thermostat in the member by which it is supported when in service and measuring the opening for which it is temporarily set, and then adjusting the setting to make the opening correspond to the first measured expansion of the thermostat.

4. The method of adjusting the setting in its supporting member of an expansion thermostat which is adapted to move the valve of a steam trap against its seat when expanded, which consists in determining the maximum expansion which the thermostat will have under operating conditions, then assembling the thermostat between its supporting member and the valve and measuring the opening for which the valve is set with the thermostat contracted, determining the difference between the opening and the previously ascertained expansion of the thermostat, and adjusting the setting by an amount equal to this difference so that the opening for which it is set will correspond to the first measured expansion.

5. An apparatus for measuring the opening of a thermostat in a thermostatic trap, comprising a casing having an open side adapted to receive the assembled thermostat, valve and trap-top, the trap top being engaged by the open end of the casing with the thermostat and valve projecting into the casing, a plunger mounted in the casing in position to be moved into engagement with the valve, a dial indicator carried by the plunger, and connections between the dial indicator and the casing, whereby the dial indicator will register the movement of the plunger.

6. An apparatus for measuring the opening of a thermostat in the thermostatic trap, comprising a casing having an open side adapted to receive the assembled thermostat, valve and trap-top, the trap top being engaged by the open end of the casing with the thermostat and valve projecting into the casing, a plunger mounted in the casing in position to be moved into engagement with the valve, a spring for retracting the plunger, a dial indicator carried by the plunger, and connections between the dial indicator and the casing, whereby the dial indicator will register the movement of the plunger.

7. An apparatus for measuring the opening of a thermostat in a thermostatic trap, comprising a casing having an open side, a plunger guided for movement in the casing toward or from the open side, a stem projecting from the plunger through a passage in the closed side of the casing, an abutment on the stem, a spring surrounding the stem between the casing and the abutment for normally holding the plunger in retracted position, an indicating mechanism mounted on the stem, and means connecting the indicating mechanism with the casing whereby the mechanism will measure the movement of the plunger.

DAVID N. CROSTHWAIT, Jr.